Feb. 17, 1925.
E. D. TILLYER
LENS
Filed Dec. 27, 1919
1,526,944
FIG. I
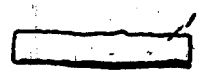
FIG. II
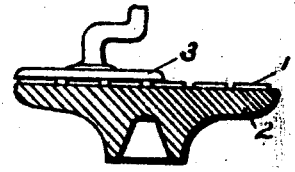
FIG. III
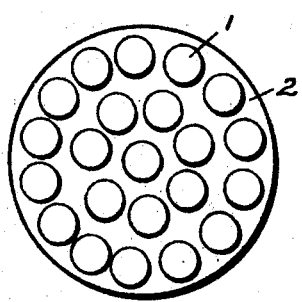
FIG. IV
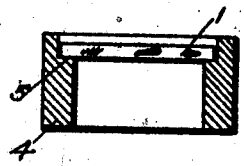
FIG. V
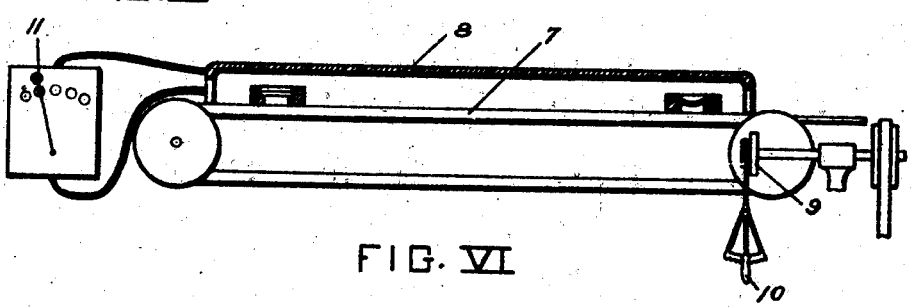
FIG. VI
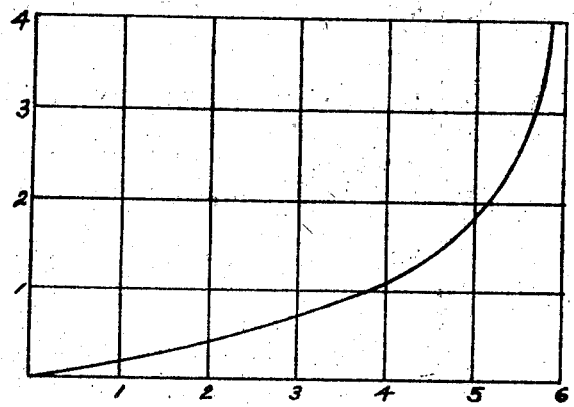
FIG. VII
INVENTOR
EDGAR D. TILLYER
BY
H. H. Styll & H. K. Parsons
ATTORNEYS Patented Feb. 17, 1925.

1,526,944

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS.

Application filed December 27, 1919. Serial No. 347,784.

*To all whom it may concern:*

Be it known that I, EDGAR D. TILLYER, a citizen of the United States, residing at Southbridge, in the county of Worcester and State of Massachusetts, have invented certain new and useful Improvements in Lenses, of which the following is a specification.

This invention relates to improvements in methods or processes of producing lenses, and has particular reference to a novel and improved process adapted for use in the production of the ophthalmic lenses.

One of the leading objects of the present invention is the provision of a novel and improved process for producing the lenses in which a portion of glass may be brought to desired curve without contact with a mold or other article clouding or impairing the clearness of the lower surface thereof.

A further object of my invention is the provision of a novel and improved process through the use of which it is possible to produce on one face of a piece of glass a desired simple or compound curve without the use of molds, grinding tools or other generally known or employed mechanism.

Other objects and advantages of my improvement should be readily apparent by reference to the following specification taken in connection with the accompanying drawings, and it will be understood that I may make my modifications in the specific steps or order thereof or method of carrying out my process as hereinafter disclosed within the scope of the appended claims without departing from or exceeding the spirit of my invention.

Figure I represents a view of a piece of glass in its rough state.

Figure II represents a view of a molded blank.

Figure III represents a semi-diagrammatic sectional view of a commonly known lens polishing process.

Figure IV represents a plan view of the lens block.

Figure V represents a sectional view illustrating a type of holder for use in my process.

Figure VI represents a diagrammatic view illustrating the carrying out of my process.

Figure VII is a chart illustrating one guide curve for use in carrying out the steps of my process.

In the drawings, the numeral 1 is employed to denote the lens blank under consideration in my process throughout, this glass being shown in Figure I as in a rough chunk or its original condition, while in Figure II it is shown as a molded blank; that is, the rough glass has been pressed within a mold, this blank, however, possessing a nearly flat form having roughened surfaces resulting from contact with the mold. The next step, therefore, ordinarily undertaken in connection with my process is preferably that of producing a finished surface on the glass by grinding and polishing or by the block 2 and tool 3, by acid etching, by fire polishing, or any other method which will produce a good surface. In any event a suitable surface is applied to the blank and in the case of the grinding and polishing operation this may be done quite inexpensively, as will be best understood by reference to Figures III and IV.

From these figures it will be noted that a large number of blanks are mounted on the lens block 2 for simultaneous polishing, the only limitation on the number being ground or polished being the size of machine used, since there is very little curvature to consider or in anywise interfere with the operation, in place of it being possible to grind but two or three lenses at a time, as is the case when lenses of deep curve are being produced through grinding.

The lens having preferably been prepared with the polished surface or surfaces aforesaid, it may then be placed upon a suitable holder, such as 4. This holder may be of any desired form and provided with suitable means for centering or positioning the blank, or may be of simple form, for convenience in understanding an extremely simple form of holder being illustrated, having the shelf portion 5 to uniformly support the blank 1 by engaging it preferably as a circle, this being particularly desirable for ordinary plain curves, although by varying the shape and position of the support or supports compound curves may also be produced.

The main essential is that the supports properly engage the blank adjacent the edge thereof so that best and most uniform final results may be secured. Inasmuch as many different mechanisms may be employed for carrying out my improved process, I have substantially diagrammatically illustrated one form of mechanism in connection with Figure VI which will serve to substantially automatically produce the desired result without particular attention to the blanks being operated upon, but it will be understood that this mechanism may be varied as desired. As shown it comprises an endless carrier 7 passing through the oven or heating chamber 8 and receiving and carrying along through said chamber 8 the supports 4 for the blanks 1. This carrier may be variably driven as through the adjustable friction drive 9 controlled by the handle 10, different rates of speed causing variations in the time the lens blank remains within the chamber 8 subjected to the heating action, while the heat itself may be varied as by the controller 11.

It will thus be seen that I preferably provide two variables in connection with my process; one, variation of heat employed, and second, a variation of time which the parts are subjected to the heat.

The essential purpose of my present invention and the highly important result obtained through the use of my novel process, is that of producing from flat or other shapes of glass, lenses having desired dioptric curve on one face thereof and without in anywise detrimentally affecting the surface previously present on the glass so formed.

I am aware that attempts have been made to accomplish this result prior to my invention, and also that it has been customary to mold blanks to various shapes by pressing same into a mold or otherwise bringing them down against the surface of a mold or former member, but this process as hitherto employed has either required very expensive and costly mechanism and been an individual proposition, or else when ordinary surface engaging molds have been employed has pitted or marred the surface of the glass from contact with the mold so that it has been necessary to both grind and polish the said surface. All these difficulties are done away with in my present invention, in that there is nothing to come in contact with the surface of the glass and any desired curve may be produced from a given blank by proper regulation of the variables, namely, temperature and heat, and with as close a degree of accuracy as can be produced by ordinary grinding.

In the carrying out of the process, therefore, I may either keep the temperature constant and vary the time which a given series of blanks of equal thickness are subjected to the temperature, or I may maintain the time constant but vary the temperature. In the one case I have found that if the temperature be held constant the curve produced on the under surface of the glass, through softening and settling down of the blank, will be in direct proportion to the time, while in the event that the time is kept constant but the temperature varied the curve produced on the glass can best be determined by reference to a suitable temperature and curve chart, such as shown in Figure VII, in which the vertical lines numbered 1 to 6 inclusive, are temperature points, and the horizontal lines 1 to 4 inclusive represent dioptric values produced with a time constant and the temperature varied from 1 to 6. By reference to this chart it will be noted that the curve indicating the dioptric increase is a rectangular hyperbola which is asymptotic to the temperature dioptre axis. It will be noted that the temperature variation may be quite satisfactorily employed for the lower dioptric values, but that the time variation is more desirable for the higher dioptric values due to the fact that the temperature as it approaches the dioptric curve toward the right of the chart mounts very rapidly for slight temperature variations rendering control of the dioptric curve produced more difficult at these temperatures.

There is one feature of my improved process to which I would call especial attention, and that is to the temperature at which the results in question are attained. Hitherto in the molding of glass or its formation through the use of molds or the like, a temperature approaching the fusing point of glass, about 1600 to 1900 degrees Fahrenheit has ordinarily been employed, rendering the glass quite soft and readily workable.

In my improved process, on the other hand, I have determined that much more satisfactory results may be attained by the use of several hundred degrees less temperature, or in other words, a temperature which will soften the glass sufficiently to allow it to settle very gradually and uniformly. This temperature has the advantage that in place of the glass becoming extremely soft and having a tendency to flow or change its shape or formation the glass at the lower temperature will have no noticeable relative movement of its component particles, or, in other words, the thickness at center and edges will remain substantially unchanged and the relationship of the upper and lower surfaces will remain the same with the difference that the parts are swung into concavo-convex in place of nearly flat form, while the uniform supporting of the parts, as on an annulus engaging the edge, causes the drop of the under surface to be substantially uniform, while as before stated, by variation of either the temperature or time, or both, if preferred, the operation may be exactly controlled to produce any desired spherical curve.

It will be understood that I have described my improved process particularly with reference to a single surface of the glass either upper or lower, as, in the commercial production of lenses on a large scale, the ability to rapidly produce strong curve lenses with a minimum of labor for the grinding and a minimum of machinery equipment is of primary importance. It is to be understood, however, that through the use of my system it is possible if desired to form the desired relative values on opposite sides of the lens in flat or slightly curved form, and to subsequently drop the lens thus formed through the use of my process to the desired deep curved or meniscus form to attain the optical advantages possessed by this form over the flat form and at the same time to produce this type of lens at less cost than is possible by present commercial methods of manufacture.

I claim:

1. The process of producing an ophthalmic lens consisting in surfacing a lens in flat form, loosely supporting the glass by engagement with its lateral edge only, subjecting it to a heating action to cause the blank to soften and curve downwardly from said edge, regulating the time and intensity of the heating action to control the curve produced, and preventing contact between the main lower surface of the glass and its support during the entire operation.

2. The process of producing ophthalmic lenses, consisting in surfacing a glass blank with an optical surface, supporting the glass by its edges only, and passing the supported blank through heat of a definite intensity at a definite speed so that the blank will sag to a predetermined curve under the action of heat and gravity without contact with anything at any time during the process, except at the supported edges.

3. The process of producing ophthalmic lenses, consisting in surfacing a glass blank with an optical surface, supporting the blank by its edges only on a support, passing the supported blank through a heat area on a moving conveyor, and controlling the heat intensity and the speed of the conveyer so that the blank will sag to a predetermined curve under the action of heat and gravity without contact with anything at any time during the process, except at the supported edges.

In testimony whereof I have affixed my signature, in presence of two witnesses.

EDGAR D. TILLYER.

Witnesses:
ESTHER M. LAFLER,
ALICE G. HASKELL.